June 13, 1967  S. W. STRICKMAN  3,325,035
CONTAINER CLOSURES

Filed June 20, 1966  4 Sheets-Sheet 1

INVENTOR.
SAMUEL W. STRICKMAN

BY Jacobi & Davidson

ATTORNEYS.

June 13, 1967   S. W. STRICKMAN   3,325,035
CONTAINER CLOSURES

Filed June 20, 1966   4 Sheets-Sheet 4

Samuel W. Strickman
INVENTOR

BY Jacobi & Davidson
ATTORNEYS

United States Patent Office 3,325,035
Patented June 13, 1967

3,325,035
CONTAINER CLOSURES
Samuel W. Strickman, Bayside, N.Y., assignor to Rosen and Strickman, Newark, N.J., a copartnership
Filed June 20, 1966, Ser. No. 558,697
17 Claims. (Cl. 215—40)

This application is a continuation-in-part of application Ser. No. 319,911, filed Oct. 29, 1963, Patent No. 3,261,-895, which in turn is a continuation-in-part of prior applications Ser. Nos. 49,659 and 49,655, filed Aug. 15, 1960, and also prior applications Ser. Nos. 829,451 and 742,816, filed July 24, 1959, and June 18, 1958, respectively, the last four mentioned applications all now being abandoned.

The present invention relates to closure seals for containers and relates more particularly to closure caps such as crown-types caps, lug-type caps and screw-type caps having improved liners.

Crown-type caps are generally utilized for containers having carbonated beverages or the like therewithin which subject the sealing means of the cap to a relatively high internal pressure. In contrast, lug and screw-type caps or closures are generally used for sealing such items as baby food bottles and the like where the internal pressure is not particularly great. Additionally, it should be understood that there has now been developed some screw-type closures for use with beverages such as beer which have a relatively low internal pressure in comparison to soda water and the like. In addition to the difference in internal pressure to which crown and lug or screw-type caps are ordinarily subjected, there are other differences in use which make the requirements for such closures somewhat specialized in each instance. For example, soda water or the like has an extremely low pH providing a relatively high acidity whereby the contents of the container will readily attack gasket or sealing means within the closure cap whereas other food items ordinarily utilizing lug or screw-type closures do not generally have such a detrimental effect on the liner or sealing material of the cap. Thus, it will be recognized that there are various problems encountered in different types of closures both from the standpoint of ability to withstand pressure and from the standpoint of ability to withstand attack from the contents of the container. On the one hand, it may be said that in such environments as soda water containers the closure is basically maintaining the contents within the container. On the other hand, in such environments as baby food bottles, the closure is basically maintaining contaminants outside of the container. It will be recognized, of course, that in both instances the sealing means of the closure serves both functions to some extent.

Now that the differences in requirements between various closures have been considered, it should be pointed out that there are many similarities in the requirements of all closure means. In the first place, it is desired in any instance to maintain a generally air tight seal to preclude deterioration of the contents within the container. Additionally, it is commercially important to provide a proper seal with a minimal amount of gasketing material thereby improving the economical nature of the situation. Further, such a sealing means should be preferably readily broken when it is desired to open the container for access to the contents thereof and in many instances preferably resealable if the contents are not fully utilized or disposed of after the container is initially opened. Other similar common requirements will be readily noted by the skilled artisan.

In general, it might be said that most closures have a two-fold purpose as noted above, firstly, to prevent contaminants from entering the container and secondly, to prevent the contents of the container from escaping. In both instances, the liner or sealing means is intended to provide a gasket to conform to the possible irregularities between the lip of the container and the closing surface of the cap. In crown-type caps there is generally the additional purpose of preventing contact of the contents of the container with the shell body from which the cap is produced, particularly due to the high acidity of the contents of most such containers. Prior practices for providing crown-type closures have generally been (1) to make such pads of composition cork with a "spot" of metal foil, (2) to form the pads or liners of resinous compounds so as to have a uniform thickness over the entire top panel of the closure shell as well as the depending skirt or (3) to form such pads with a thicker annular area of the same material for engaging the lip of the container. Such procedures have also been common in other closures although limited-area gaskets have also been used with such other gaskets.

In general, materials having high resistance to penetration would not demand as great a thickness for protecting the shell from attack by the contents as would be required to provide the necessary sealing gasket for conformation to the container lip. Accordingly, it is highly desirable from an economic point of view to provide a seal particularly for use in a crown cap in which the liner or cushion pad has a thick outer annular portion of excellent resealable properties for engagement with the container lip and a thinner central portion having a high resistance to penetration to provide assurance against contact with the contents of the container.

The art has heretofore employed elastomeric or plastic materials of varying description, including plastisols of polyvinylchlorides, in the search to find more economically feasible materials for preparing the liner and/or seal having the hereinbefore mentioned characteristics. Foamable as well as non-foamable plastisol of polyvinylchloride have been heretofore employed. As their use has heretofore generally required some form of shaping of the surface of the liner to impart the desired liner characteristics mentioned above, the central portion covering the area to come in contact with the container's content and the thicker annular sealing portion are of the same material. The use of heretofore known foamable plastisols as liner materials in crown type closures has been curtailed because existing blowing agents prepare foams unsuitable for such use because residues therein are readily extractable by the highly acidic container content and are toxic or off-flavor imparting or because such known blowing agents require techniques of application which are not readily amenable to limiting the foamed material in its contact with the container's content.

It is one feature of the present invention to provide closure seals having cushion pads requiring a substantially lesser quantity of material to form than the cushion pads or liners employed in similar closures heretofore known and more importantly, to limit such cushion pads to the areas of the closures where they are most useful.

A further feature of the invention is the provision of a crown-type closure comprising a crown shell having a top panel, curved corner radius, depending skirt and a liner having a thin central portion formed from a non-foamable plastisol and a thicker annular portion of vinyl foam taking the form in cross section of a quadrant disposed peripherally about the inside surface of the shell having its arcuate surface extending between the top panel and some point on the curved corner radius adjacent the depending skirt, thus having a major portion of the foam adapted to surround the outside of a container mouth and only a flattened edge portion of the foam in sealing engagement with the top sealing edge of the contained mouth. In a preferred embodiment of crown caps according to this invention the inner surface of the shell is coated with an impervious coating such as lacquer and the thin central portion of non-foamable plastisol is so disposed as to overlie the inner surface of the top panel to come in contact with the content of the container but such that the periphery of the thin central portion is free of engagement with the curved corner radius and depending skirt and the annular vinyl foam is bonded to the impervious coating on the curved corner radius and to a limited peripheral portion of the thinner central portion in such manner that the cured vinyl foam will have a minimum of contact with the content of the container assuring the production of a liner with a surface which is inert and impervious to the content of the container and one which has excellent resealable properties for engaging the lip of the container, and further assuring good adhesion of the liner to the crown shell adjacent the outer edge thereof.

Another feature of the invention is the provision of a closure, preferably a crown-type closure having the inner surface of its top panel coated with one material having outstanding characteristics for assuring against contact of the shell with the contents of the container and having a different material with outstanding resealable properties in a limited area of the inner surface of the closure for engaging the lip of the container.

Yet a further feature and important object of this invention is the provision of closures such as lug and screw-type closures provided with an annular gasket or sealing means formed of a material foamed in situ and capable of cold flowing during the application of the closure to the container top to form a seal adjacent the outside and the inside of the container lip as well as along the upper edge of the container lip. In this regard as with the crown-type caps it is an important feature of this invention to provide a foamed gasket which is capable of substantial depression and which will readily mold itself to the container lip after application to insure an optimum seal even in the presence of irregularities or defects which are commonly found in the lips of such containers.

Still another object of this invention is to provide container closures which are extremely inexpensive to manufacture, a feature quite important in view of the large quantities of such closures commercially required. However, it is the objective of this invention to provide such inexpensive closures without in any way diminishing the quality of the seal and, in fact, with a great increase in the quality of such seal.

Further features and advantages of the present invention will become apparent from the more detailed description thereof as hereinafter set forth and the illustrative practice of the invention shown in the accompanying drawings in which:

Like reference characters refer to like parts throughout the several views of the drawings.

The crown shells, or other closure caps, may be prepared in the customary fashion by providing a sheet of steel or tin plate with lithographed matter on one face and with a coating of a vinyl resin lacquer on the other or inner face. A further coating of non-foamable plastisol over the lacquer may be employed and in fact is a preferred embodiment for certain applications, particularly crown caps. The charge of heat foamable plastisol is then applied to the peripheral portion of the inner face of the closure, i.e., that portion of the inner face of the crown shell which will permit a minimum of contact with the contents of the container for which the crown shell is to be used as a closure, and allow for a seal about the outside edges of the mouth of such container. Following the application of the heat foamable plastisol the closure blank is subjected to temperatures above 200° F., preferably between 280° and 310° F., for a period of time sufficient to foam the ring to approximately 3 to 6 times its original volume. With many closures, particularly lug or screw-type closures, it may be possible to delete the lacquer and the unfoamed plastisol liner since the material of the shell may not be prone to attack by the contents of the container.

Figure 5:
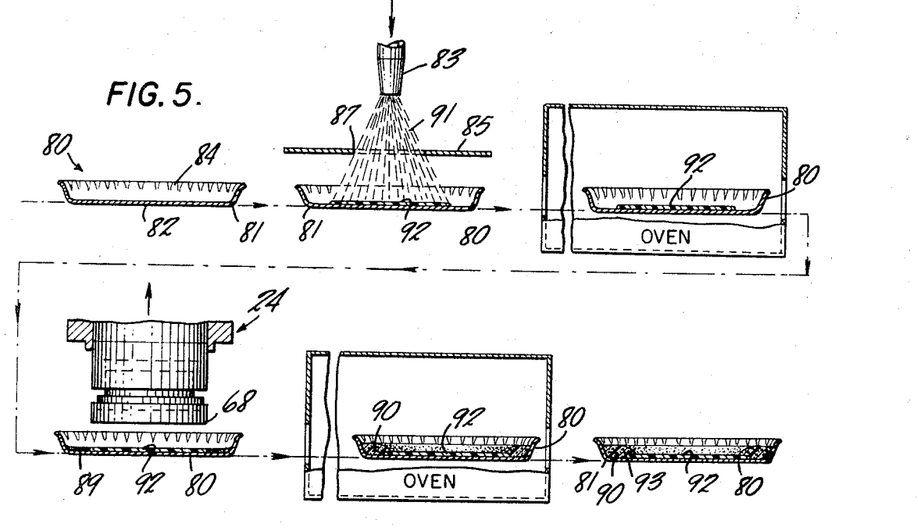
FIGURE 5 is a flow diagram showing one embodiment of a method for making the closures of this invention.
Figure 6:
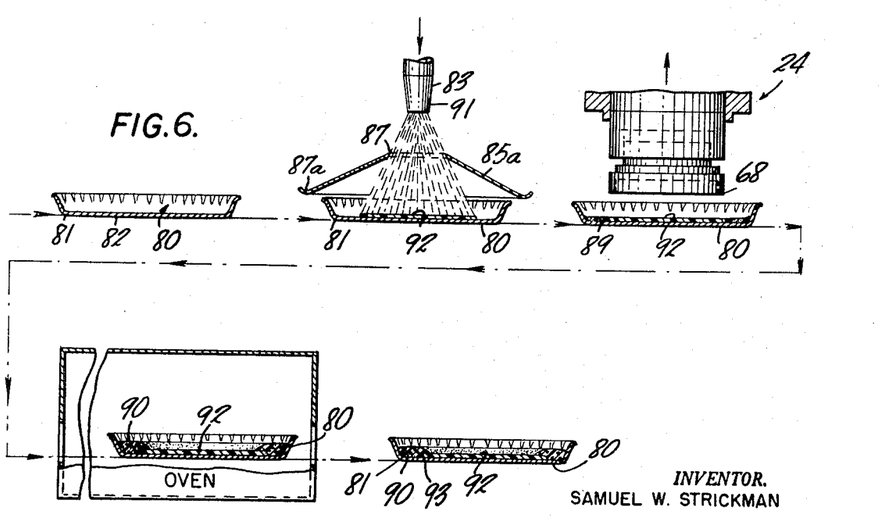
FIGURE 6 is a flow diagram showing another and preferred embodiment of a method for making the closures.

Referring first to FIGURES 5 and 6, two embodiments of a method for making a closure liner, particularly for a crown cap, are illustrated schematically. In FIGURE 5 a steel blank 80 is provided in which the circular end top panel 82 is bounded by a curved top corner radius 81 and a corrugated skirt portion 84. The outer surface of the blank is provided with a lithograph coating, not shown, and the inner surface of the blank is provided with a coating of vinyl resin lacquer, also not shown.

As a first step in the manufacture, the steel blank 80 is positioned beneath a nozzle 83 which is adapted to dispense a measured quantity, preferably 50–60 milligrams for crown caps, of non-foaming plastisol 92 as a spray, depositing a layer of uniform thickness as shown in the drawing at 92. Interposed between the blank 80 and the nozzle 83 is a baffle 85 having a circular opening 87 therein which serves to confine the spray of plastisol 91 to a predetermined area on the top panel 82 when the crown blank 80 is disposed coaxially with the opening. As shown in the drawing, the unfoamed plastisol is confined to the center area of top panel 82 spaced apart from the curved corner radius 81 preferably by from $\frac{1}{16}$ to $\frac{1}{8}$ of an inch. By positioning the center "spot" in this manner, flashing of the plastisol during subsequent steps in the method is avoided. Also, the spacing permits direct application of the foamable fluid mix onto the lacquer coating and permits formation of a stronger bond between the final sealing ring and the blank.

Following the application of the non-foaming plastisol as a center "spot," the blank 80 is passed to an oven as shown, where the layer of plastisol is heated to a temperature above 200° F., preferably from 320° F.–350° F., for 1 to 3 minutes to flux the resin and to at least partially cure it. Alternatively, the blank 80 can be passed under a suitable source of heat rays such as an infrared lamp means or an ultra-violet lamp means. Following this step the blank and plastisol center spot are cooled and the blank 80 is positioned beneath a suitable apparatus for dispensing a foamable fluid mix in a ring form, such as the dispenser shown schematically at 24. The dispenser 24 deposits a measured quantity, preferably between 100 and 110 milligrams for a crown cap, of a foamable fluid mix on the peripheral area of the top panel 82 adjacent the rounded corner radius 81 and the center spot of unfoamed plastisol 92.

The blank 80 is next inserted in an oven and the ring of foamable material is subjected to a temperature above 200° F., preferably between 280° F. and 310° F., for a period of less than 3 minutes to foam the ring to approximately 3 to 6 times its original volume. As shown in the last step of the flow diagram of FIGURE 5, a "ring" of foamed polyvinylchloride 90 fills the area of the curved corner radius 81 extending upwardly to, but not covering, the edge of the corrugated skirt portion 84. In addition, during the foaming step, the ring 90 has overlapped a slight portion of the unfoamed plastisol center "spot" 92 as shown at 93. Generally speaking, the foamed "ring" of sealing material has the form in cross section of a quadrant having its arcuate surface extending between the top panel 82 and a point on the curved corner radius 81 adjacent the skirt portion 84.

An alternate embodiment of this invention is shown in FIGURE 6 wherein a blank 80 as shown in FIGURE 5 is coated with a center "spot" of unfoamed plastisol 92 and a peripheral "ring" of foamed fluid mix 90. In this embodiment, a conical baffle 85a is employed to facilitate recovery of the sprayed non-foamable plastisol which is retained by the baffle. A gutter 87a in the baffle 85 is provided to direct excess plastisol to a collecting means, not shown. In addition to this feature, the modified baffle provides less problems with fouling of the circular opening 87 with a consequent increase in the accuracy of measuring the amount of non-foamable plastisol applied as a spot 92.

It will also be noted that the modification shown in FIGURE 6 applies the peripheral "ring" of foamable plastic material before the center spot is fluxed. Thereafter both the foamable and non-foamable materials are heated in an oven to foam and cure the foamable material and to cure the non-foamable material. In the practice of this embodiment, it is of course essential that the two materials have compatible temperature requirements for foaming and curing.

Figure 1:
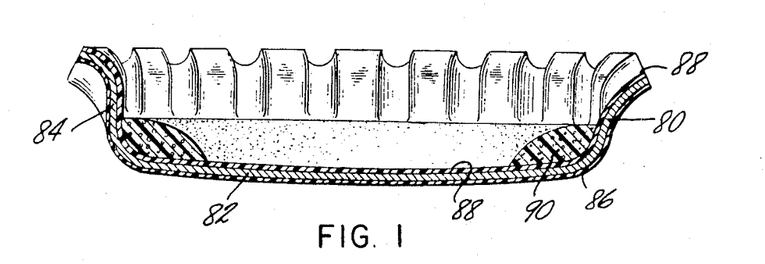
FIGURE 1 is a cross sectional view of one embodiment of a crown-type closure constructed according to this invention.
Figure 2:
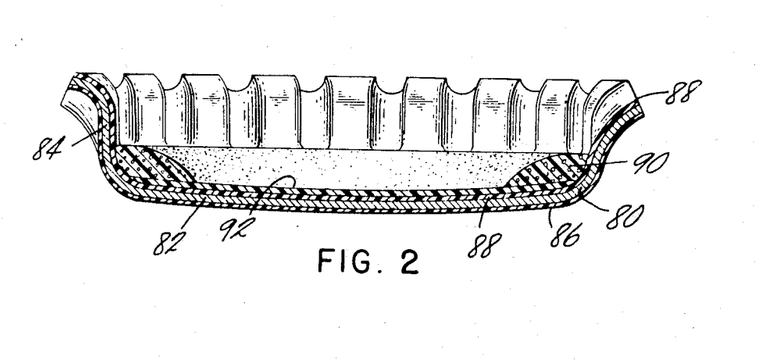
FIGURE 2 is a cross sectional view of a modified form of crown closure provided by this invention having an unfoamed liner and a ring-shaped, foamed, gasket.

Two embodiments of crown seals according to this invention are shown in FIGURES 1 and 2. In FIGURE 1, the crown closure comprises the steel blank 80 having a top or crown panel 82 and a peripheral skirt 84 projecting therefrom and provided with crimps terminating in spaced relation to the crown panel. The outer surface of the blank 80 is provided with a lithographed coating 86. The inner surface of blank 80 is provided with a coating of lacquer 88. On the periphery of the inner surface is a gasket 90 of foamed polyvinylchloride composition. The gasket 90 is of substantially orbiculate configuration and is confined to those portions of the blank 80 which will contact the top and side edges of the container mouth. The sealing gasket 90 has excellent adherence to the blank 80 and when placed upon a bottle and sealed, forms an excellent seal which does not impart off-flavors to the contents of the container.

FIGURE 2 illustrates a preferred embodiment of a crown prepared according to this invention. In this embodiment, a coating of unfoamed plastisol 92 is applied to the inner surface of the blank 80 so that it overlies the lacquer coating 88 on the crown panel 82. This embodiment is of special advantage in instances where lacquer does not satisfactorily protect the steel crown from attack by container contents.

Figure 3:
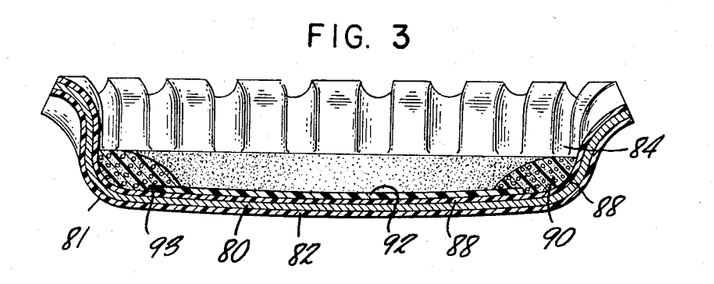
FIGURE 3 is a cross sectional view of a preferred form of crown closure provided by this invention having a center "spot" of unfoamed material spaced apart from the skirt portions and a foamed "ring" in contact with the skirt.

FIGURE 3 illustrates the embodiment of the crown prepared according to the methods outlined in FIGURES 5 and 6. A "spot" of unfoamed plastisol 92 overlies the lacquer coating 88 in the central area of the crown panel which will eventually be directly exposed to the container's content. The spot 92 does not extend across the entire top panel 82. Instead, the spot 92 is spaced some distance, preferably from 1/16 to 1/8 of an inch, from the curved corner radius 81. The foamed "ring" 90 extends from a point on the curved corner radius 81 adjacent the skirt portion 84 to the "spot" 92 and a substantial portion of the ring 90 is in direct contact with the underlying lacquer coating 88, thus insuring a strong bond. Preferably, the ring 90 also slightly overlaps the spot 92, as shown at 93.

Figure 4:
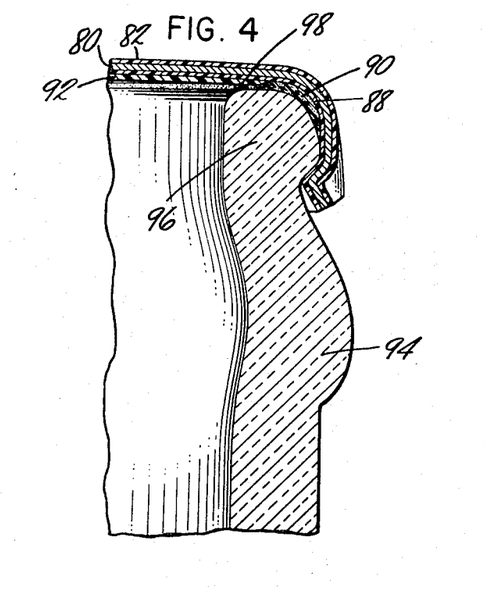
FIGURE 4 is a fragmentary cross sectional view of a container carrying the crown closure of FIGURE 3 thereon in sealing relation with the container lip.

FIGURE 4 illustrates the relative positions of the unfoamed plastisol spot 92 and the foamed ring 90 after the cap 80 has been applied to a conventional container 94 having a lip 96. It will be noted that the ring 90 has undergone compression and that a minimum area of contact of the foamed material is presented to the interior of the container, as shown at 98, and that the ring provides a seal along the top and side peripheral edges of the beaded lip 96.

Preferred heat foamable plastisols suitable for the gasket forming material of the present invention comprise as basic ingredients (a) a resin, (b) a plasticizer therefor, (c) a foaming agent capable of releasing oxygen in situ at temperatures above about 200° F. and (d) an oxygen adsorbing agent for controlling the rate of foaming and the concomitant properties of the resulting foam such as density, deflection rate, hand, tensile strength and sealing characteristics.

It has been found that for crown liner seals for each 100 parts of resin, it is preferred to use from 42 to 100 parts of plasticizer, from 1 to 10 parts of blowing agents, from 5 to 60 parts of the oxygen adsorbing agent, and from 1 to 3 parts of stabilizer.

The resinous materials used according to this invention include the polyvinyl chlorides which may be of the well-known stir-in type. Typical of this type of polyvinyl chlorides are the well-known polyvinyl chlorides available commercially as "QYNV," a product of Bakelite Co., division of Union Carbide & Carbon Co., Geon 121, a product of B. F. Goodrich Chemical Co., Opalon 410, a product of Monsanto Chemical Co., VR 50, U.S. Rubber Co., and those produced by other well-known manufacturers. In general, mixtures of a resin having a slow solvation rate and a resin having a fast solvation rate produces a foam having a desirable uniformity and cell structure. Preferred sealing characteristics in crown liners and/or seals are obtained with Opalon 410. Mixtures of Opalon 410 and Geon 121 are particularly preferred.

Other vinyl resins known in the art to be suitable for use in preparing foamed articles may be employed according to this invention. Thus, copolymers of vinyl chloride and vinyl acetate, such as the 97:3% copolymer, copolymers of vinyl chloride and vinylidene chloride, and copolymers of vinyl chloride and ethyl maleate may be employed. In applications where the foam will be required to resist aqueous solutions, the chloride content of the polymer or copolymer should be high; preferably the copolymer should contain at least 90% of the vinyl chloride. Generally, the proportion of resin to plasticizer may range from 40 parts of resin to 60 parts of plasticizer depending on the nature of the plasticizer.

A wide variety of plasticizers well known in the resin and plastics art may be used, such plasticizers are either monomeric or polymeric, or a combination of both. Illustrative of the monomeric types are acetyl-tributyl-citrate, glycollic acid esters (Monsanto), butyl-decyl-phthalate, octyl-decyl-phthalate, dioctyl phthalate, tricresylphosphate, triphenylphosphate, dicapryl-phthalate, dioctyl-sebacate, dioctyl-adipate, diisooctyl adipate, diisooctyl phthalate, Harflex 500 (Harchem), 4GO (Carbide and Carbon). For crown closures to be used for carbonated soft drings, acetyl tributyl citrate is a preferred plasticizer.

Among the polymeric types of plasticizers are "Plastolein 9720" (Emery Industries, Inc.) (see bulletin entitled "Plastolein Plasticizers," copyright 1954), Plasticizer 711 (Archer-Daniels-Midland), "Plastolein 9758" (Emery), Harflex 300 and Harflex 330 (Harchem), and R2H (Carbide and Carbon).

It is to be noted that where the foamed material of this invention is used in connection with products for human consumption, as for example, closures for containers of foods or beverages, it is desirable to utilize plasticizers or mixtures of plasticizers that are not readily subject to extraction by the food or beverage and which are not toxic. Accordingly, the polymeric (relatively high molecular weight) plasticizers which are not subject to complete or substantially complete extraction are preferred, although acetyl-tributyl citrate and the glycollates (even though they are monomeric) are useful.

The oxygen which is released in situ so as to foam the heat foamable mixtures of the invention is readily supplied by contacting an alkali metal perborate, peroxide and/or perchlorate with a component slightly more acidic than the oxygen supplying component, i.e., a component having a sufficient acidity as to the oxygen supplying ingredient so as to facilitate decomposition of the ingredient within the environment of the compositions thereby liberating oxygen in situ. Alkali metal perborates, particularly sodium perborate, are preferred. Exemplary acid components include acid salts of polybasic inorganic acids such as alkali metal hydrogen phosphates, alkaline earth metal hydrogen phosphates; and metal salts of higher molecular weight organic carboxylic acids and weaker bases such as calcium stearate, aluminum stearate, zinc stearate, magnesium stearate, and the like. Disodium phosphate and Stayrite No. 90 (a mixture of metallic soaps, predominately calcium, aluminum and zinc stearates, with minor amounts of other fatty acids (manufactured by the Witco Company are particularly preferred.

The oxygen adsorbing agents which may be used according to this invention may be any finely divided material which will adsorb a substantial portion of the gaseous oxygen evolved during the heating of the oxygen-producing material at a certain temperature and which will release the oxygen at a higher temperature. Examples of suitable oxygen adsorbing agents include finely divided anhydrous aluminum oxide, activated carbon, mica, silica gel, barium, sulfate, carbon black, aluminum flake, resin-coated calcium carbonate, anhydrous borax, magnesium trisilicate and resin coated chalk. Anhydrous aluminum oxide is particularly preferred.

The proportions of acidic component, e.g., disodium acid phosphate and the oxygen supplying component, e.g., sodium perborate, can vary from 1:1 to 6 parts of phosphate to 45 parts of perborate. In general the oxygen supplying component as well as the acid phosphate should be of a state of division so as to pass through a screen having a mesh size of at least 200. When sodium perborate and/or anhydrous aluminum hydroxide are used as oxygen supplying and oxygen adsorbing components, respectively, the particles should pass through a screen size having a mesh of at least 325.

The sequence in which the ingredients of the foamable fluid mix are combined is an important feature of this invention. According to the preferred method, the vinyl resin must be mixed in and thoroughly wetted by the plasticizer before the oxygen adsorbing agent is added. If the reverse sequence is employed, the oxygen adsorbing agent is apparently unable to function properly, and it is not effective in adsorbing released oxygen. As a consequence, the blowing system fails.

Figures 7, 8:
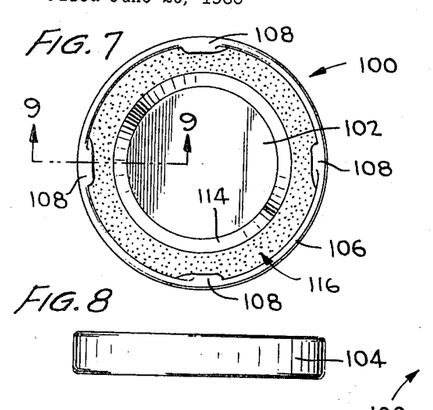
FIGURE 7 is a top view of a lug-type closure having a foamed "ring" sealing means according to this invention.
FIGURE 8 is a side elevational view of the closure of FIGURE 7.
Figure 9:
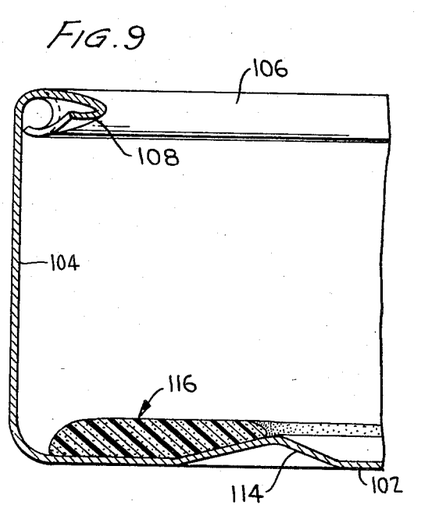
FIGURE 9 is an enlarged fragmentary cross-sectional view taken substantially on line 9—9 of FIGURE 7.

Referring now to FIGURES 7–9, a lug-type closure according to this invention is designated generally by the reference numeral 100 and comprises basically a cup-shaped shell formed of steel or other suitable materials and having a top panel 102 and a peripheral skirt portion 104 with a rolled bead 106 adjacent its terminal portion. A plurality of lugs 108, generally four in number are formed from the bead 106 at spaced locations for engaging a screw thread such as shown at 110 in FIGURE 13 on a conventional container 112. Lug-type shells are generally provided with a slight annular indentation 114 in the top panel 102.

A "ring" of foamed gasket-forming material is shown at 116 as disposed in the top panel between the annular depression or groove 114 and the peripheral skirt 104.

Figure 13:
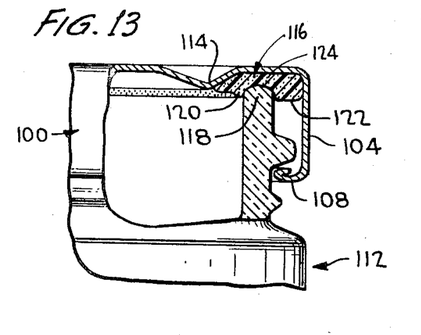
FIGURE 13 is a fragmentary cross-sectional view of a container carrying a closure such as the closure of FIGURE 7 thereon in sealing relation with the container lip.

Referring particularly to FIGURE 13, it will be seen that the gasket 116 engages the container lip 118 and cold flows therearound to form an inner seal 120, an outer seal 122 and a top seal 124. In instances wherein the internal pressure of the container is not particularly great such as with baby food bottles and the like the inner seal 120 is particularly useful. With soda water containers and the like where the internal pressure is particularly great there is little or no advantage in providing such an inner seal since the pressure will generally lift the inner seal away from the container lip. Therefore, since the materials in such containers generally are highly acidic and have a tendency to attack the gasket-forming material it is particularly desirable in such instances to avoid the inner seal and limit the "ring" so as to minimize contact between the gasket-forming material and the contents of the container. In contrast, where such high internal pressure and such highly acidic container contents are not present, the inner seal may be provided, if desired, to improve the sealing characteristics in the event of a container having particularly large irregularities or defects in the top or outside surface of the lip. Thus, in such situations an arrangement such as shown in the embodiment of FIGURES 7–9 and 13 may be provided, it being understood that in any event, the "ring" of gasket-forming material is positioned where desired and limited as necessary.

Figure 10:
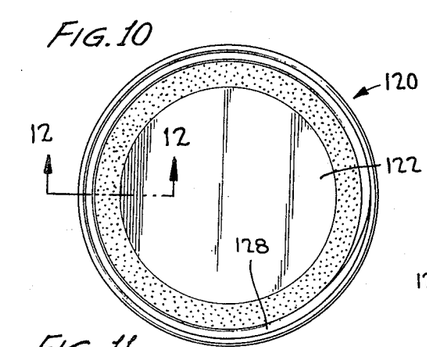
FIGURE 10 is a top plan view of a screw-type closure having a foamed "ring" sealing means according to this invention.
Figure 11:
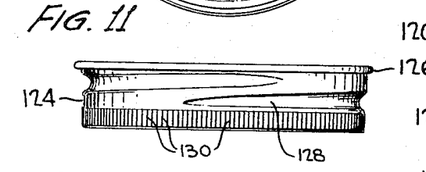
FIGURE 11 is a side elevational view of the closure of FIGURE 10.
Figure 12:
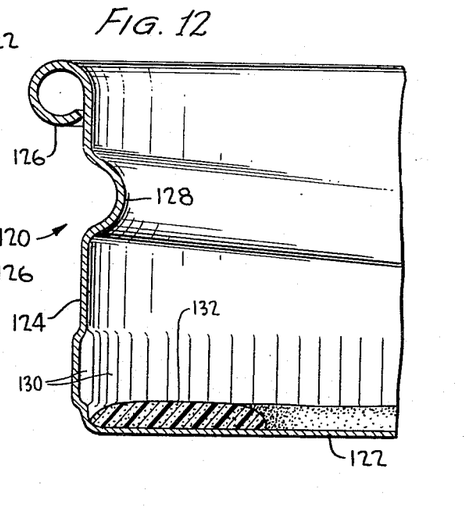
FIGURE 12 is an enlarged fragmentary cross-sectional view taken substantially on line 12—12 of FIGURE 10.

FIGURES 10–12 show a screw-type closure designated generally as 120 formed of a shell having a top panel 122 and a peripheral skirt portion 124 terminating in a bead 126. Such closures generally have screw threads 128 provided in the peripheral skirt portion 124 as well as a plurality of small indentations 130 to improve frictional gripping of the closure during use. Of course, indentations such as 130 may be provided in a lug-type closure if desired. In the screw-type closure 120 a "ring" 132 of gasket-forming material is provided on the top panel 122 in juxtaposition to the peripheral skirt portion 124.

A screw-type closure such as shown in FIGURES 10–12 would provide a sealing engagement with a container lip of the type shown in FIGURE 13 with the lug-type closure.

It will be understood that with either the lug or screw-type closures a lacquer coating on the shell may be provided, if desired, as well as a center "spot" of unfoamed plastisol material. The same materials suggested hereinabove for forming the gasket in the crown-type closure are useful in the lug or screw-type closures as are the methods of application and processing.

The thickness of the "ring" for the lug and screw-type closures must be sufficient to provide from about 0.015 to about 0.020 sealant over the container lip after cap application and must compress at least approximately 0.010 inch to accommodate variations in the lip surface.

Further details as to the method, apparatus and compositions utilized in the manufacture of the instant closures will be found in the aforementioned parent application Serial Number 319,911 as well as in copending application Serial Number 511,206 filed on December 2, 1965, and entitled "Resinous Composition and Methods of Making and Foaming the Same" and copending application Serial Number 558,698, filed on an even date herewith and entitled "Apparatus for Forming Ring-Shaped Extrudates."

Although it will be understood that the sizes of the closure caps manufactured according to this invention may vary, the following examples are set forth as illustrative:

EXAMPLE I

A crown for bottles containing carbonated beverages wherein a sealing means using a foamed material made in accordance with this invention in lieu of cork, is produced as follows:

A foamable fluid mix was prepared from the following ingredients in the indicated proportions:

Opalon 410, a commercial polyvinyl chloride or emulsion grade in powder form, having a particle size of 1–2 microns and a molecular weight of 70,000–80,000, sold by Monsanto Chemical Co., 100 parts;
Harflex 330, a polymeric plasticizer, manufactured by Wallace & Tiernan, Inc., 40 parts;
Diisooctyl phthalate, a non-toxic plasticizer, 40 parts;
Hydrated aluminum oxide (H–1, Aluminum Corp. of Canada), having a particle size such that 75–83% of the material passes through a 325 mesh screen, 20 parts;
Stayrite 90, a mixture of non-toxic metallic stearates sold by the Witco Chemical Co., 1 part; and
Sodium perborate, 3 parts;
the parts being expressed by weight. (Disodium phosphate, at a level of 3 parts, may be substituted for the Stayrite 90 with comparable results.)

The fluid mix was prepared by adding the Harflex 330 and the diisooctyl phthalate to a mixing vessel together with the sodium perborate and Stayrite. These materials are stirred to make a uniform suspension. The Opalon 410 resin is then added and mixed to thoroughly wet the resin powder with the liquid mixture. The aluminum oxide is then added and uniformly blended until a smooth mixture is obtained. The fluid mix is then deaerated to remove entrapped air.

The conventional tin-coated steel shell is lacquered with a conventional vinyl resin lacquer. A non-foamable polyvinyl chloride plastisol comprising a mixture of emulsion grade polyvinyl chloride in a liquid plasticizer is sprayed in a thin layer on the inside top panel of the crown. The layer of plastisol is prevented from contacting the skirt portion of the crown. The layer of non-foamable plastisol is then heated to a temperature of 350° F. for one minute to flux the resin components of the plastisol and to cause it to set. As little as 50 mg. of unfoamed plastisol are applied in this manner.

After the crown has been returned to room temperature, a ring of the foamable fluid mix prepared above is applied to the peripheral area of the top panel of the crown in engagement with the skirt portion and with the previously applied layer of plastisol. Approximately 110 mg. of the foamable mix is applied in this manner. The crown is then heated to a temperature of about 300° F. for a period of three minutes to cause the ring of foamable material to foam. The ring expands to approximately three to four times its original volume, adheres to the top panel and to the skirt portion of the crown and takes the form in cross section of a quadrant having its arcuate surface extending between the top panel and the skirt portion. The width of the foamed ring, i.e., distance between the inside and outside diameter thereof, is approximately ⅛ inch. The crown is then cooled and is ready to apply as a closure to bottles containing carbonated beverages.

The sealing characteristics of the crown prepared according to this example are excellent and surpass, in some respects, the sealing characteristics of cork liners. In addition, no reaction takes place between the carbonated beverages and the liner or the cap itself. Furthermore, no off-flavors are imparted to the contents of the container because the plasticizer and other ingredients of the foamable material are essentially non-reactive with the container's content.

EXAMPLE II

A conventional lug-type closure for baby food bottles or the like is provided with a sealing means made in accordance with this invention as follows:

A foamable fluid mix is prepared according to the procedure set forth in detail in Example I and a charge of between about 200 and 500 milligrams of the foamable plastisol, preferably about 400 milligrams, is deposited in the form of a "ring" on the top panel of the shell. Such a shell generally has an outside diameter of approximately 2.375 inches maximum and an inside lug diameter of approximately 2.090 inches minimum. The height of the peripheral skirt is approximately 0.380 inch maximum. The internal diameter of the foam ring is preferably approximately 1.770 inches and, in any event, must not extend over the annular depression conventionally found in such closures. The foam ring has a flat upper surface preferably having an outside diameter of at least 2.150 inches and in general, the ring is spaced from the corner radius where the top panel meets the peripheral skirt, but if desired, the foam may contact and extend partly up the peripheral skirt interior. Generally, such an arrangement merely wastes the foam material and is not necessary since with such closures the peripheral skirt is not in direct contact with the outside of the container lip due to the spacing effected by the screw threads on the container mouth and the lugs on the closure.

The ring of gasket-forming material is processed as in Example I to foam and fuse the same in a manner to provide the desired dimensional relationships set forth.

The sealing characteristics of a lug-type closure prepared according to this example are also found to be excellent and may be manufactured in a minimum of time with a minimum of expense and a minimum of gasket-forming material.

EXAMPLE III

A screw-type closure for containers such as baby food bottles having a foam "ring" made in accordance with this invention is produced in a manner quite similar to Example II with the following preferred dimensional characteristics for ordinary use:

The closure shell preferably has screw threads having a minimum inside diameter of approximately 2.655 inches with an outside diameter of the peripheral skirt portion of approximately 2.795 inches maximum. The foam ring preferably has an inside diameter of approximately 2.300 inches maximum measured on the flat surface and an outside diameter on the flat of approximately 2.705 inches minimum.

Similar excellent sealing characteristics are provided with the use of such a closure as was found with the crown-type closures and the lug-type closures described in Example I and Example II above.

It is to be noted that in both the lug and screw-type closures described in Examples II and III, the outer diameter of the flat area on the gasket ring is greater than the inner diameter of either the lugs or the screw threads on the shell whereby a portion of the gasket extends beyond this initial contact between the screw threads of the container lip and the engaging member of the closure. This arrangement insures an excellent outside seal and the preferred dimensions set forth above for the flat portion of the ring provides sufficient gasketing material for cold flow during application to the container mouth whereby an excellent inner seal is also provided.

Table 1 below gives the formulations of eight additional foamable fluid mixes which may be employed according to this invention. The compositions illustrate a number of oxygen adsorbing materials which may be employed, either alone or in combination with another oxygen adsorbing material. These mixes were prepared following the method set forth above, care being taken that the vinyl resin was thoroughly mixed with and wetted by the plasticizer before the oxygen adsorbing material was added to the mix.

functions both as a stabilizer and as a reactant with the oxygen donor or releasor, for example, a perborate, a peroxide or a chlorate, etc.

TABLE 1.—FOAMABLE FLUID MIX (PARTS BY WEIGHT)

| Ingredients | A | B | C | D | E | F | G | H | I |
|---|---|---|---|---|---|---|---|---|---|
| Geon 121 | | | | | 100 | 50 | 50 | 50 | 38 |
| Opalon 410 | 100 | 100 | 100 | 100 | | | | | 62 |
| Dioctyl phthalate | 90 | 90 | 90 | 90 | 90 | 45 | 45 | 45 | |
| Plastolein 9720 | 12 | | 12 | 12 | | 6 | 6 | 6 | |
| Harflex 500 | 30 | 30 | 30 | 30 | 30 | 15 | 15 | 15 | |
| Disodium phosphate | 6 | 12 | 6 | 6 | 3 | 3 | 3 | 3 | |
| Sodium perborate | 25 | 25 | 15 | 45 | 25 | 12.5 | 12.5 | 12.5 | 3 |
| Mica, No. 75 | 5 | | 2 | 2 | | | 2.5 | 5 | |
| Syloid 244 | 1.5 | | 1 | 1.5 | 10 | | | 1.25 | |
| Activated carbon | 0.5 | | | | | | | | |
| Santicizer 141 | | 12 | | | 12 | | | | |
| Anhydrous borax, powdered | | 25 | | | | | | | |
| Aluminum flake, metal powder | | | | 1 | | | | | |
| Raven Black (carbon) | | | | 0.5 | | | | | |
| Sparmite (Barium sulfate) | | | | | | 1.25 | | | |
| Acetyl-tributyl citrate | | | | | | | | | 100 |
| Stayrite 90 | | | | | | | | | 1 |
| Aluminum oxide, anhydrous | | | | | | | | | 20 |
| Coloring agent | | | | | | | | | .5 |
| TiO$_2$ | | | | | | | | | 10 |

Referring to the ingredients in Table 1 above, Geon 121 is a white powdery stir-in vinyl chloride resin having a molecular weight of about 70,000 to 80,000, a particle size such that 100 percent thereof will pass through a screen of 100 mesh on the Tyler scale when determined by wet screen analysis, a specific gravity of about 1.40, a bulk density of 20–25 pounds per cubic foot and a specific viscosity of about 0.57–0.63; and Opalon 410 is a white powdery stir-in vinyl chloride resin having a molecular weight of about 70,000 to 80,000, a particle size of 1–2 microns, a specific gravity of about 1.40, a specific viscosity of about .53–.55 determined as a solution of .40 grams of resin in 100 ml. of cyclohexane at 25° C., a dry bulk density of about .25–.35 grams per cubic centimeter. Similarly Plastolein 9720 and Harflex 500 are plasticizers and are described earlier in the specification. The Mica No. 75 is a finely divided mica sold by the U.S. Mica Company. Syloid 244 is a highly porous pure silica gel in the form of a free flowing, white powder, having a density of 4.0–4.5 lbs./cu. ft. and a particle size of 2–3 microns, manufactured by Davison Chemical Company. The Santicizer 141, an alkyl aryl phosphate, is sold by Monsanto Chemical Company. The aluminum flake is a finely divided metallic aluminum sold by the Aluminum Corporation of America, bearing the numerical designation 221. The Raven Black is a finely divided carbon sold by the Columbian Carbon Company, a division of Southern Chemical Company. The Sparmite is a finely divided barium sulfate sold by C. K. Williams Company.

Fluid mixes described in Table 1 are useful in a variety of applications. Composition E requires 40 minutes of heating to fuse, whereas most of the other compositions will fuse within 20 minutes. Composition E will provide six-fold increase in volume. Composition H is particularly acceptable in that it provides a reasonably soft foam having good deflection characteristics. This composition provides a sixteen-fold increase in volume during unconfined blowing. Composition I is particularly useful and preferred as the heat foamable mix for depositing the annular foamed sealing ring in the liner of the crown-type closures intended for carbonated soft drinks.

It will be noted that the foamed products and articles provided therewith which are made in accordance with this invention result from the heating of a ring of fluid mix comprising polyvinyl chloride, plasticizing material (a single plasticizer or a plurality of plasticizers), and an oxygen compound which is capable of releasing elemental or nascent oxygen when the mix is heated to about 200° F. to initiate gassing or blowing.

As has been shown, a suitable acidic component of the mixture, such as a metal hydrogen phosphate, e.g., an alkali or alkaline earth metal phosphate, as aforesaid, Fluid mixes embodying the specifically named components shown above have a general composition as follows:

Based on 100 parts of polyvinyl chloride, the plasticizing material is present in an amount of from about 50 to 200 parts, preferably from 60 to 25 parts; the dual functioning stabilizer and acidic component, i.e., disodium phosphate is present in an amount from 3 to 25 parts, preferably from 6 to 12 parts; and the oxygen releasing compound, the sodium perborate as the blowing agent, is present in an amount from 2 to 45 parts, preferably 3 to 30 parts, based on the total amount of polyvinyl chloride and plasticizing material. In specific applications the determination of the amount of blowing agent employed is adjusted according to need.

As to the amount of the filler-adsorber component of the mix, it varies according to the desired use of the end products with respect to resilience of the foamed material and the adsorptive quality of the filler in providing the specific desired volume of the blown or expanded material. While the amount of the filler or oxygen adsorbing agent to be used for specific applications may readily be determined by a laboratory test, it may be present, relative to the blowing agent, in a ratio of from 1:1 to 60:1, by weight.

The theoretical considerations underlying the amounts of filler-absorber to be used appear to be as follows: The amount of filler-absorber and blowing agent may be varied as stated above, but the amount of filler-absorber present with any given amount of any given blowing agent must be sufficiently small that subsequent liberation of oxygen provides a cellular structure and sufficiently large to prevent at least substantially uncontrolled oxygen release. Merely adding a substantial quantity of filler having oxygen absorbing properties, without adjusting the amount thereof as herein specified, causes adsorption by too many different filler paticles and results in insufficient ultimate blowing. In accordance with these theoretical considerations, an oxygen adsorbing agent is a composition present in sufficient amount to control, but not suppress, blowing.

While a particular type of foamable gasket-forming material and unfoamed shell-protecting materials, namely polyvinyl chlorides and certain lacquers, have been referred to hereinbefore as preferred, and while such materials have been found to provide particularly excellent results, it is to be understood that, at least in its broadest aspects, container closures in accordance with this invention may be produced using other suitable materials. However, the special advantages of the materials set forth cannot be overemphasized.

It will be seen that there is herein provided improved container closures which satisfy all of the objectives set forth above, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense. Accordingly,

What is claimed is:

1. A container closure comprising a shell having a top panel and a peripheral skirt portion, a ring of foamed, gasket-forming material, carried by the top panel of said shell in juxtaposition to said peripheral skirt portion and a spot of unfoamed shell-protecting material carried by said top panel of said shell and extending at least partially between said ring of gasket-forming material and said shell.

2. The container closure of claim 1 wherein said gasket-forming material is a foamed polyvinylchloride plastisol and wherein said shell-protecting material is an unfoamed polyvinylchloride plastisol compatible therewith.

3. The container closure of claim 2 further including a coating of lacquer interposed between said shell and both said gasket-forming material and said shell-protecting material.

4. The container closure of claim 2 wherein said spot of shell-protecting material is spaced from the juncture of said top panel and said peripheral skirt portion and wherein said ring of gasket-forming material covers a portion of said shell-protecting material and extends in orbiculate configuration into contact with a part of said peripheral skirt portion.

5. The container closure of claim 1 wherein said shell is a crown cap shell.

6. The container closure of claim 1 wherein said shell is a lug cap shell.

7. The container closure of claim 1 wherein said shell is a screw cap shell.

8. The container closure of claim 1 wherein said shell is adapted to seal a container having screw threads thereon, said ring of gasket-forming material being of sufficient width to provide an inner seal, an outer seal and a top seal between the container lip and said closure.

9. The container closure of claim 1 wherein said shell is adapted to seal a container having screw threads thereon, said ring of gasket-forming material being adapted to compress at least 0.010 inch to accommodate variations in the container lip.

10. The container closure of claim 1 wherein said shell is adapted to seal a container having screw threads thereon, said gasket-forming material having a thickness sufficient to provide from approximately 0.015 to approximately 0.020 inch of material after application of the cap to the container.

11. A container closure comprising a shell having a top panel and a pheripheral skirt portion, a ring of foamed, gasket-forming material, carried by the top panel of said shell in juxtaposition to said peripheral skirt portion and an impervious coating covering the entire inner surface of said shell, a thin pad of cured non-foamable vinyl plastisol bonded to the impervious coating and disposed thereon such as to overlie the inner surface of said top panel to come in contact with the content of the container and such that the periphery of said pad is spaced from said peripheral skirt portion, a thicker annular sealing portion of cured vinyl foam of substantially quadrant shaped cross section disposed peripherally about the inside surface of said shell having its arcuate surface extending between said top panel and some point on said peripheral skirt portion adjacent the juncture of the same with said top panel and bonded to the impervious coating on said peripheral skirt and to a limited peripheral portion of said pad such that the cured vinyl foam will have minimum contact with the content of the container when the container closure is in sealing position on the container.

12. The container closure of claim 11 wherein said cured vinyl foam is formed from a heat foamable plastisol comprising a finely devided particulate vinyl resin, a plasticizing amount of plasticizer therefor, an effective amount of a heat decomposable component which releases nascent oxygen at temperatures above about 200° F. sufficient to foam said heat foamable plastisol and to expand same to at least 3 times its original volume, an effective amount of an acidic component having an acidity as to said heat decomposable component sufficient to facilitate the decomposition thereof to release nascent oxygen in situ, and an effective amount of a finely divided solid particulate component which first adsorbs oxygen and controllably releases the adsorbed oxygen at the foaming temperature of the plastisol at a rate which produces a stable cellular foam.

13. The closure cap according to claim 12 wherein the vinyl resin is an emulsion grade polyvinylchloride, the heat decomposable component which releases nascent oxygen is an alkali metal borate, the acidic component is selected from the group consisting of an alkali metal hydrogen phosphate, and a non-toxic metallic soap and mixtures thereof and the finely divided solid particulate component which first adsorbs oxygen and controllably releases the adsorbed oxygen is selected from the group consisting of anhydrous aluminum oxide, resin-coated chalk, activated carbon, mica, silica gel, barium sulfate, carbon black, aluminum flakes, resin-coated calcium carbonate, anhydrous borax, magnesium trisilicate and mixtures thereof.

14. The closure cap according to claim 13 wherein the heat foamable plastisol comprises 100 parts of the resin, 42 to 100 parts of plasticizer, 1 to 10 parts of a combination of an alkali metal perborate and acidic component in the ratio of 1 to 1 to 6 parts of acidic component to 45 parts of the perborate and 5 to 60 parts of the finely divided oxygen adsorbing agent.

15. The closure cap according to claim 11 wherein the major portion of said ring is adapted to surround the outside edge of a container mouth and form a seal therewith when said closure is applied to a container, and wherein only a flattened edge portion of said ring is in sealing engagement with top sealing edge of the container mouth.

16. A container closure comprising a shell having a top panel and a peripheral skirt portion, a ring of foamed gasket-forming material carried at least partially by said top panel in juxtaposition to said peripheral skirt portion, and as a separate element, a layer of a substantially non-cellular shell-protecting material carried by said top panel and extending at least over the area inside said ring and partially between said ring and said shell, the upper surface of said shell-protecting material inside of said ring being exposed to the contents of the container with which the closure is used, said gasket-forming material being a foamed vinyl chloride material and said shell-protecting material being an unfoamed vinyl chloride material, said gasket-forming material having been freely foamed, at least substantially unconfined, in situ, the upper surface of said ring being generally arcuate and convex.

17. The container closure of claim 16 further including as an additional separate element, a coating of lacquer interposed between said shell and both said basket-forming material and said shell-protecting material.

References Cited

UNITED STATES PATENTS

| | | | |
|---|---|---|---|
| 2,130,746 | 9/1938 | Scofield | 215—40 |
| 2,326,809 | 8/1943 | White | 215—44 |
| 2,389,761 | 11/1945 | Burgeni | 215—39 X |
| 2,752,059 | 6/1956 | Schneider | 215—40 |
| 2,901,446 | 8/1959 | Hawkins | 260—2.5 |

FRANKLIN T. GARRETT, *Primary Examiner.*